(12) United States Patent
Raichelgauz et al.

(10) Patent No.: US 10,614,626 B2
(45) Date of Patent: Apr. 7, 2020

(54) SYSTEM AND METHOD FOR PROVIDING AUGMENTED REALITY CHALLENGES

(71) Applicant: Cortica, Ltd., Tel Aviv (IL)

(72) Inventors: Igal Raichelgauz, New York, NY (US); Karina Odinaev, New York, NY (US); Yehoshua Y Zeevi, Haifa (IL)

(73) Assignee: Cortica Ltd., Tel aviv (IL)

( * ) Notice: Subject to any disclaimer, the term of this patent is extended or adjusted under 35 U.S.C. 154(b) by 432 days.

(21) Appl. No.: 15/265,117

(22) Filed: Sep. 14, 2016

(65) Prior Publication Data
US 2017/0004656 A1 Jan. 5, 2017

Related U.S. Application Data

(63) Continuation-in-part of application No. 14/050,991, filed on Oct. 10, 2013, which is a continuation-in-part
(Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 16/00* (2019.01)
*G06T 19/00* (2011.01)
(Continued)

(52) U.S. Cl.
CPC ............ *G06T 19/006* (2013.01); *G06F 16/40* (2019.01); *G06F 16/43* (2019.01); *G06F 16/48* (2019.01)

(58) Field of Classification Search
CPC ......... G06F 17/30283; G06F 17/30607; G06F 17/30056; G06F 17/30017;
(Continued)

(56) References Cited

U.S. PATENT DOCUMENTS 4,733,353 A 3/1988 Jaswa
4,932,645 A 6/1990 Schorey et al.
(Continued)

FOREIGN PATENT DOCUMENTS

WO 0231764 4/2002
WO 0231764 A2 4/2002
(Continued)

OTHER PUBLICATIONS

Boari et al, "Adaptive Routing for Dynamic Applications in Massively Parallel Architectures", 1995 IEEE, Spring 1995.
(Continued)

*Primary Examiner* — Srirama Channavajjala
(74) *Attorney, Agent, or Firm* — Reches Patents

(57) ABSTRACT

A system and method for providing augmented reality challenges. The method includes obtaining at least one multimedia content element; causing generation of at least one signature for each obtained multimedia content element; determining, based on the generated signatures, at least one augmented reality challenge; identifying, based on the determined at least one augmented reality challenge, at least one augmented reality object; creating at least one challenge multimedia content element by causing addition of the at least one augmented reality object to the obtained at least one multimedia content element; and causing a display of the created at least one challenge multimedia content element.

20 Claims, 7 Drawing Sheets

Related U.S. Application Data of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, now Pat. No. 9,798,795, which is a continuation-in-part of application No. 12/195,863, filed on Aug. 21, 2008, now Pat. No. 8,326,775, and a continuation-in-part of application No. 12/084,150, filed on Apr. 7, 2009, now Pat. No. 8,655,801, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009, now Pat. No. 9,798,795.

(60) Provisional application No. 62/371,862, filed on Aug. 8, 2016, provisional application No. 61/860,261, filed on Jul. 31, 2013.

(51) Int. Cl.
  *G06F 16/43* (2019.01)
  *G06F 16/40* (2019.01)
  *G06F 16/48* (2019.01)

(58) Field of Classification Search
  CPC ......... G06F 17/30244; G06F 17/30743; G06F 16/40; G06F 16/43; G06F 16/48; G01C 21/343; G01C 21/3644; G01C 21/3679
  See application file for complete search history.

(56) References Cited

U.S. PATENT DOCUMENTS

| | | |
|---|---|---|
| 4,972,363 A | 11/1990 | Nguyen et al. |
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador et al. |
| 5,745,678 A * | 4/1998 | Herzberg ............... G06F 21/10 705/51 |
| 5,763,069 A | 6/1998 | Jordan |
| 5,806,061 A | 9/1998 | Chaudhuri et al. |
| 5,850,352 A * | 12/1998 | Moezzi ............... H04N 13/139 345/419 |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 5,991,306 A | 11/1999 | Burns et al. |
| 6,038,560 A | 3/2000 | Wical |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,282,548 B1 * | 8/2001 | Burner ............... G06F 17/3089 |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,557,042 B1 * | 4/2003 | He ............... G06F 17/30017 707/999.001 |
| 6,560,597 B1 | 5/2003 | Dhillon et al. |
| 6,594,699 B1 | 7/2003 | Sahai et al. |
| 6,601,026 B2 | 7/2003 | Appelt et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,681,032 B2 | 1/2004 | Bortolussi et al. |
| 6,686,970 B1 * | 2/2004 | Windle ............... H04N 1/00183 348/584 |
| 6,704,725 B1 | 3/2004 | Lee |
| 6,728,706 B2 | 4/2004 | Aggarwal et al. |
| 6,732,149 B1 | 5/2004 | Kephart |
| 6,738,075 B1 * | 5/2004 | Torres ............... G11B 27/034 348/333.05 |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B1 | 12/2005 | Chandrasekar et al. |
| 6,985,172 B1 | 1/2006 | Rigney et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,043,473 B1 | 5/2006 | Rassool et al. |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,340,358 B2 | 3/2008 | Yoneyama |

(56) References Cited

U.S. PATENT DOCUMENTS

| | | | |
|---|---|---|---|
| 7,346,629 | B2 | 3/2008 | Kapur et al. |
| 7,353,224 | B2 | 4/2008 | Chen et al. |
| 7,376,672 | B2 | 5/2008 | Weare |
| 7,392,238 | B1 | 6/2008 | Zhou et al. |
| 7,406,459 | B2 | 7/2008 | Chen et al. |
| 7,433,895 | B2 | 10/2008 | Li et al. |
| 7,441,037 | B2 | 10/2008 | Saxena |
| 7,450,740 | B2 | 11/2008 | Shah et al. |
| 7,464,086 | B2 | 12/2008 | Black et al. |
| 7,523,102 | B2 | 4/2009 | Bjarnestam et al. |
| 7,526,607 | B1 | 4/2009 | Singh et al. |
| 7,529,659 | B2 | 5/2009 | Wold |
| 7,536,384 | B2 | 5/2009 | Venkataraman et al. |
| 7,542,969 | B1 | 6/2009 | Rappaport et al. |
| 7,548,910 | B1 | 6/2009 | Chu et al. |
| 7,555,477 | B2 | 6/2009 | Bayley et al. |
| 7,555,478 | B2 | 6/2009 | Bayley et al. |
| 7,562,076 | B2 | 7/2009 | Kapur |
| 7,574,436 | B2 | 8/2009 | Kapur et al. |
| 7,574,668 | B2 | 8/2009 | Nunez et al. |
| 7,577,656 | B2 | 8/2009 | Kawai et al. |
| 7,581,166 | B2 | 8/2009 | Renger et al. |
| 7,657,100 | B2 | 2/2010 | Gokturk et al. |
| 7,660,468 | B2 | 2/2010 | Gokturk et al. |
| 7,694,318 | B2 | 4/2010 | Eldering et al. |
| 7,836,054 | B2 | 11/2010 | Kawai et al. |
| 7,920,894 | B2 | 4/2011 | Wyler |
| 7,921,107 | B2 | 4/2011 | Chang et al. |
| 7,933,407 | B2 | 4/2011 | Keidar et al. |
| 7,974,994 | B2 | 7/2011 | Li et al. |
| 7,987,194 | B1 | 7/2011 | Walker et al. |
| 7,987,217 | B2 | 7/2011 | Long et al. |
| 7,991,715 | B2 | 8/2011 | Schiff et al. |
| 8,000,655 | B2 | 8/2011 | Wang et al. |
| 8,036,893 | B2 | 10/2011 | Reich |
| 8,098,934 | B2 | 1/2012 | Vincent et al. |
| 8,112,376 | B2 | 2/2012 | Raichelgauz et al. |
| 8,266,185 | B2 | 9/2012 | Raichelgauz et al. |
| 8,312,031 | B2 | 11/2012 | Raichelgauz et al. |
| 8,315,442 | B2 | 11/2012 | Gokturk et al. |
| 8,316,005 | B2 | 11/2012 | Moore |
| 8,326,775 | B2 | 12/2012 | Raichelgauz et al. |
| 8,345,982 | B2 | 1/2013 | Gokturk et al. |
| 8,352,745 | B2 | 1/2013 | McKeeth |
| 8,457,827 | B1 | 6/2013 | Ferguson et al. |
| 8,495,489 | B1 | 7/2013 | Everingham |
| 8,548,828 | B1 | 10/2013 | Longmire |
| 8,655,801 | B2 | 2/2014 | Raichelgauz et al. |
| 8,655,878 | B1 | 2/2014 | Kulkarni et al. |
| 8,677,377 | B2 | 3/2014 | Cheyer et al. |
| 8,682,667 | B2 | 3/2014 | Haughay |
| 8,688,446 | B2 | 4/2014 | Yanagihara |
| 8,706,503 | B2 | 4/2014 | Cheyer et al. |
| 8,775,442 | B2 | 7/2014 | Moore et al. |
| 8,799,195 | B2 | 8/2014 | Raichelgauz et al. |
| 8,799,196 | B2 | 8/2014 | Raichelquaz et al. |
| 8,818,916 | B2 | 8/2014 | Raichelgauz et al. |
| 8,868,619 | B2 | 10/2014 | Raichelgauz et al. |
| 8,868,861 | B2 | 10/2014 | Shimizu et al. |
| 8,880,539 | B2 | 11/2014 | Raichelgauz et al. |
| 8,880,566 | B2 | 11/2014 | Raichelgauz et al. |
| 8,886,648 | B1 | 11/2014 | Procopio et al. |
| 8,898,568 | B2 | 11/2014 | Bull et al. |
| 8,922,414 | B2 | 12/2014 | Raichelgauz et al. |
| 8,959,037 | B2 | 2/2015 | Raichelgauz et al. |
| 8,990,125 | B2 | 3/2015 | Raichelgauz et al. |
| 9,009,086 | B2 | 4/2015 | Raichelgauz et al. |
| 9,031,999 | B2 | 5/2015 | Raichelgauz et al. |
| 9,087,049 | B2 | 7/2015 | Raichelgauz et al. |
| 9,104,747 | B2 | 8/2015 | Raichelgauz et al. |
| 9,165,406 | B1 | 10/2015 | Gray et al. |
| 9,191,626 | B2 | 11/2015 | Raichelgauz et al. |
| 9,197,244 | B2 | 11/2015 | Raichelgauz et al. |
| 9,218,606 | B2 | 12/2015 | Raichelgauz et al. |
| 9,235,557 | B2 | 1/2016 | Raichelgauz et al. |
| 9,256,668 | B2 | 2/2016 | Raichelgauz et al. |
| 9,323,754 | B2 | 4/2016 | Ramanathan et al. |
| 9,330,189 | B2 | 5/2016 | Raichelgauz et al. |
| 9,438,270 | B2 | 9/2016 | Raichelgauz et al. |
| 9,466,068 | B2 | 10/2016 | Raichelgauz et al. |
| 9,646,006 | B2 | 5/2017 | Raichelgauz et al. |
| 9,679,062 | B2 | 6/2017 | Schillings et al. |
| 9,807,442 | B2 | 10/2017 | Bhatia et al. |
| 9,984,369 | B2 | 5/2018 | Li et al. |
| 2001/0019633 | A1 | 9/2001 | Tenze et al. |
| 2001/0038876 | A1 | 11/2001 | Anderson |
| 2001/0056427 | A1 | 12/2001 | Yoon et al. |
| 2002/0010682 | A1 | 1/2002 | Johnson |
| 2002/0010715 | A1 | 1/2002 | Chinn et al. |
| 2002/0019881 | A1 | 2/2002 | Bokhari et al. |
| 2002/0032677 | A1 | 3/2002 | Morgenthaler et al. |
| 2002/0038299 | A1 | 3/2002 | Zernik et al. |
| 2002/0059580 | A1 | 5/2002 | Kalker et al. |
| 2002/0072935 | A1 | 6/2002 | Rowse et al. |
| 2002/0087530 | A1 | 7/2002 | Smith et al. |
| 2002/0099695 | A1* | 7/2002 | Abajian .............. G06F 17/3002 |
| 2002/0099870 | A1 | 7/2002 | Miller et al. |
| 2002/0107827 | A1 | 8/2002 | Benitez-Jimenez et al. |
| 2002/0123928 | A1 | 9/2002 | Eldering et al. |
| 2002/0126872 | A1 | 9/2002 | Brunk et al. |
| 2002/0129140 | A1 | 9/2002 | Peled et al. |
| 2002/0129296 | A1 | 9/2002 | Kwiat et al. |
| 2002/0143976 | A1 | 10/2002 | Barker et al. |
| 2002/0147637 | A1 | 10/2002 | Kraft et al. |
| 2002/0152267 | A1 | 10/2002 | Lennon |
| 2002/0157116 | A1 | 10/2002 | Jasinschi |
| 2002/0159640 | A1 | 10/2002 | Vaithilingam et al. |
| 2002/0161739 | A1 | 10/2002 | Oh |
| 2002/0163532 | A1 | 11/2002 | Thomas et al. |
| 2002/0174095 | A1 | 11/2002 | Lulich et al. |
| 2002/0178410 | A1 | 11/2002 | Haitsma et al. |
| 2003/0028660 | A1 | 2/2003 | Igawa et al. |
| 2003/0041047 | A1 | 2/2003 | Chang et al. |
| 2003/0050815 | A1 | 3/2003 | Seigel et al. |
| 2003/0078766 | A1 | 4/2003 | Appelt et al. |
| 2003/0086627 | A1 | 5/2003 | Berriss et al. |
| 2003/0089216 | A1 | 5/2003 | Birmingham et al. |
| 2003/0093790 | A1 | 5/2003 | Logan et al. |
| 2003/0105739 | A1 | 6/2003 | Essafi et al. |
| 2003/0126147 | A1 | 7/2003 | Essafi et al. |
| 2003/0182567 | A1 | 9/2003 | Barton et al. |
| 2003/0191764 | A1 | 10/2003 | Richards |
| 2003/0200217 | A1 | 10/2003 | Ackerman |
| 2003/0217335 | A1 | 11/2003 | Chung et al. |
| 2003/0229531 | A1 | 12/2003 | Heckerman et al. |
| 2004/0003394 | A1 | 1/2004 | Ramaswamy |
| 2004/0025180 | A1 | 2/2004 | Begeja et al. |
| 2004/0068510 | A1 | 4/2004 | Hayes et al. |
| 2004/0107181 | A1 | 6/2004 | Rodden |
| 2004/0111432 | A1 | 6/2004 | Adams et al. |
| 2004/0111465 | A1 | 6/2004 | Chuang et al. |
| 2004/0117367 | A1 | 6/2004 | Smith et al. |
| 2004/0117638 | A1 | 6/2004 | Monroe |
| 2004/0128142 | A1 | 7/2004 | Whitham |
| 2004/0128511 | A1 | 7/2004 | Sun et al. |
| 2004/0133927 | A1 | 7/2004 | Sternberg et al. |
| 2004/0143602 | A1* | 7/2004 | Ruiz ..................... G08B 13/122 |
| 2004/0153426 | A1 | 8/2004 | Nugent |
| 2004/0215663 | A1 | 10/2004 | Liu et al. |
| 2004/0249779 | A1 | 12/2004 | Nauck et al. |
| 2004/0260688 | A1 | 12/2004 | Gross |
| 2004/0267774 | A1 | 12/2004 | Lin et al. |
| 2005/0021394 | A1 | 1/2005 | Miedema et al. |
| 2005/0114198 | A1 | 5/2005 | Koningstein et al. |
| 2005/0131884 | A1 | 6/2005 | Gross et al. |
| 2005/0144455 | A1* | 6/2005 | Haitsma ............ G06F 17/30743 |
| | | | 713/176 |
| 2005/0172130 | A1 | 8/2005 | Roberts |
| 2005/0177372 | A1 | 8/2005 | Wang et al. |
| 2005/0238198 | A1 | 10/2005 | Brown et al. |
| 2005/0238238 | A1 | 10/2005 | Xu et al. |
| 2005/0245241 | A1 | 11/2005 | Durand et al. |
| 2005/0249398 | A1 | 11/2005 | Khamene et al. |
| 2005/0256820 | A1 | 11/2005 | Dugan et al. |

(56) References Cited

U.S. PATENT DOCUMENTS

| | | |
|---|---|---|
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2006/0288002 A1 | 12/2006 | Epstein et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0027844 A1 | 2/2007 | Toub et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0049789 A1 | 2/2008 | Vedantham et al. |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0159622 A1 | 7/2008 | Agnihotri et al. |
| 2008/0163288 A1 | 7/2008 | Ghosal et al. |
| 2008/0165861 A1 | 7/2008 | Wen et al. |
| 2008/0172413 A1 | 7/2008 | Chiu |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0307454 A1 | 12/2008 | Ahanger et al. |
| 2008/0313140 A1 | 12/2008 | Pereira et al. |
| 2008/0313146 A1 | 12/2008 | Wong et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0037408 A1 | 2/2009 | Rodgers |
| 2009/0043637 A1 | 2/2009 | Eder |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0216761 A1 | 8/2009 | Raichelgauz et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0277322 A1 | 11/2009 | Cai et al. |
| 2009/0282218 A1 | 11/2009 | Raichelgauz et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0198626 A1 | 8/2010 | Cho et al. |
| 2010/0211565 A1 | 8/2010 | Lotito |
| 2010/0268524 A1 | 10/2010 | Nath et al. |
| 2010/0284604 A1 | 11/2010 | Chrysanthakopoulos |
| 2010/0306193 A1 | 12/2010 | Pereira et al. |
| 2010/0318493 A1 | 12/2010 | Wessling |
| 2010/0322522 A1 | 12/2010 | Wang et al. |
| 2010/0325138 A1 | 12/2010 | Lee et al. |
| 2010/0325581 A1 | 12/2010 | Finkelstein et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0197857 A1 | 8/2012 | Huang et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2009/0220138 A1 | 12/2012 | Zhang et al. |
| 2012/0315009 A1 | 12/2012 | Evans et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |

(56) References Cited

U.S. PATENT DOCUMENTS

| | | |
|---|---|---|
| 2013/0159298 A1 | 6/2013 | Mason et al. |
| 2013/0173635 A1 | 7/2013 | Sanjeev |
| 2013/0226930 A1 | 8/2013 | Arngren et al. |
| 2013/0283401 A1 | 10/2013 | Pabla et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2015/0100562 A1 | 4/2015 | Kohlmeier et al. |
| 2015/0120627 A1 | 4/2015 | Hunzinger et al. |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0324356 A1 | 11/2015 | Gutierrez et al. |
| 2016/0007083 A1 | 1/2016 | Gurha |
| 2016/0026707 A1 | 1/2016 | Ong et al. |
| 2017/0017638 A1 | 1/2017 | Satyavarta et al. |
| 2017/0154241 A1 | 6/2017 | Shambik et al. |

FOREIGN PATENT DOCUMENTS

| | | |
|---|---|---|
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | 20070049282 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Cernansky et al., "Feed-forward Echo State Networks"; Proceedings of International Joint Conference on Neural Networks, Montreal, Canada, Jul. 31-Aug. 4, 2005.

Chuan-Yu Cho, et al., "Efficient Motion-Vector-Based Video Search Using Query by Clip", 2004, IEEE, Taiwan, pp. 1-4.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan, et al. "Content-Based Retrieval of Music and Audio", 1997 Institute of Systems Science, National University of Singapore, Singapore (Abstract).

Gomes et al., "Audio Watermaking and Fingerprinting: For Which Applications?" University of Rene Descartes, Paris, France, 2003.

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Guo et al, "AdOn: An Intelligent Overlay Video Advertising System", SIGIR, Boston, Massachusetts, Jul. 19-23, 2009.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ihab Al Kabary, et al., "SportSense: Using Motion Queries to Find Scenes in Sports Videos", Oct. 2013, ACM, Switzerland, pp. 1-3.

International Search Authority: "Written Opinion of the International Searching Authority" (PCT Rule 43bis.1) including International Search Report for International Patent Application No. PCT/US2008/073852; dated Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.

IPO Examination Report under Section 18(3) for corresponding UK application No. GB1001219.3, dated Sep. 12, 2011.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251 German National Research Center for Information Technology.

Jianping Fan et al., "Concept-Oriented Indexing of Video Databases: Towards Semantic Sensitive Retrieval and Browsing", IEEE, vol. 13, No. 7, Jul. 2004, pp. 1-19.

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.

Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Mandhaoui, et al, "Emotional Speech Characterization Based on Multi-Features Fusion for Face-to-Face Interaction", Universite Pierre et Marie Curie, Paris, France, 2009.

Marti et al, "Real Time Speaker Localization and Detection System for Camera Steering in Multiparticipant Videoconferencing Environments", Universidad Politecnica de Valencia, Spain, 2011.

May et al., "The Transputer", Springer-Verlag, Berlin Heidelberg, 1989, teaches multiprocessing system.

Mei, et al., "Contextual In-Image Advertising", Microsoft Research Asia, pp. 439-448, 2008.

(56) References Cited

OTHER PUBLICATIONS

Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on CONTROL '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Ortiz-Boyer et aL, "CIXL2: A Crossover Operator for Evolutionary Algorithms Based on Population Features", Journal of Artificial Intelligence Research 24 (2005) 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Semizarov et al. "Specificity of Short Interfering RNA Determined through Gene Expression Signatures", PNAS, 2003, pp. 6347-6352.
Shin-Fu Chang, et al., "VideoQ: A Fully Automated Video Retrieval System Using Motion Sketches", 1998, IEEE, , New York, pp. 1-2.
Theodoropoulos et al, "Simulating Asynchronous Architectures on Transputer Networks", Proceedings of the Fourth Euromicro Workshop on Parallel and Distributed Processing, 1996. PDP '96.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Wang et al. "A Signature for Content-based Image Retrieval Using a Geometrical Transform", ACM 1998, pp. 229-234.
Wei-Te Li et al., "Exploring Visual and Motion Saliency for Automatic Video Object Extraction", IEEE, vol. 22, No. 7, Jul. 2013, pp. 1-11.
Whitby-Strevens, "The Transputer", 1985 IEEE, Bristol, UK.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Yanai, "Generic Image Classification Using Visual Knowledge on the Web," MM'03, Nov. 2-8, 2003, Tokyo, Japan, pp. 167-176.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
The International Search Report and the Written Opinion for PCT/US2016/054634 dated Mar. 16, 2017, ISA/RU, Moscow, RU.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2017/015831, ISA/RU, Moscow, Russia, dated Apr. 20, 2017.
Brecheisen, et al., "Hierarchical Genre Classification for Large Music Collections", ICME 2006, pp. 1385-1388.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
Santos, et al., "SCORM-MPEG: an Ontology of Interoperable Metadata for Multimedia and e-Learning", 2015 23rd International Conference on Software, Telecommunications and Computer Networks (SoftCOM) Year. 2015, pp. 224-228, DOI: 10.1109/SOFTCOM.2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.

(56) References Cited

OTHER PUBLICATIONS

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Hogue, "Tree Pattern Inference and Matching for Wrapper Induction on the World Wide Web", Master's Thesis, Massachusetts Institute of Technology, Jun. 2004, pp. 1-106.
Hogue, "Tree Pattern Inference and Matching for Wrapper Induction on the World Wide Web", Master's Thesis, Massachusetts institute of Technology, 2004, pp. 1-106.
Howlett et al, "A Multi-Computer Neural Network Architecture in a Virtual Sensor System Application", International Journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.

Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al, "HIBRID-SOC: A Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug, 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University Advent Technical Report # 222-2006-8, Mar. 20, 2007, pp. 1-17.
Yanagawa et al., "Columbia University's Baseline Detectors for 374 LSCOM Semantic Visual Concepts", Columbia University Advent Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Chinchor, Nancy A. et al.; Multimedia Analysis + Visual Analytics = Multimedia Analytics; IEEE Computer Society; 2010; pp. 52-60. (Year: 2010).
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.

(56) References Cited

OTHER PUBLICATIONS

Wang et al., "Classifying Objectionable Websites Based onImage Content", Stanford University, pp. 1-12.
Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.

* cited by examiner

SYSTEM AND METHOD FOR PROVIDING AUGMENTED REALITY CHALLENGES

CROSS-REFERENCE TO RELATED APPLICATIONS

This application claims the benefit of U.S. Provisional Application No. 62/371,862 filed on Aug. 8, 2016. This application is a continuation-in-part (CIP) of U.S. patent application Ser. No. 14/050,991 filed on Oct. 10, 2013, now pending, which claims the benefit of U.S. Provisional Application No. 61/860,261 filed on Jul. 31, 2013. The Ser. No. 14/050,991 Application is a continuation-in-part of U.S. patent application Ser. No. 13/602,858 filed on Sep. 4, 2012, now U.S. Pat. No. 8,868,619, which is a continuation of U.S. patent application Ser. No. 12/603,123 filed on Oct. 21, 2009, now U.S. Pat. No. 8,266,185. The Ser. No. 12/603,123 Application is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414 filed on Aug. 21, 2007, and which is also a continuation-in-part of the above-referenced U.S. patent application Ser. No. 12/084,150;

(3) U.S. patent application Ser. No. 12/348,888 filed on Jan. 5, 2009, now pending, which is a continuation-in-part of the above-mentioned U.S. patent application Ser. Nos. 12/084,150 and 12/195,863; and (4) U.S. patent application Ser. No. 12/538,495 filed on Aug. 10, 2009, now U.S. Pat. No. 8,312,031, which is a continuation-in-part of the above-referenced U.S. patent application Ser. Nos. 12/084,150, 12/195,863, and 12/348,888.

All of the applications referenced above are herein incorporated by reference.

TECHNICAL FIELD

The present disclosure relates generally to analysis of multimedia content, and more specifically to adding augmented reality objects to multimedia content based on analysis of the multimedia content.

BACKGROUND

The vast growth of content available over the Internet has led to a significant increase in the amount of time people spend interacting with computers. This can be especially common in children, who are more inclined to stay indoors to play electronic games than to go outside and participate and physical activities.

Research has shown that, during the 1970s and 1980s, children participated on average in over two hours of play outside each weekday and a further nine hours of play outside on weekends. Currently, the time children spend outside playing is estimated at no more than an hour each weekday, and less than 5 hours on weekends. The decrease in time spent performing physical activities for people generally and children in particular is concerning because physical activity is not only important for remaining active and healthy, but also for socializing.

Augmented reality (AR) technology typically presents real world information (e.g., an image of a real world environment) augmented by virtual information (e.g., images, text, sounds, etc.). Such real world information may include data from various sensors such as, but not limited to, accelerometers, GPS devices, compasses, gyroscopes, proximity sensors, cameras, and microphones.

Virtual objects are objects within a software application that can be displayed on a display of a computing device. In the context of digital gaming, virtual objects may be utilized to populate the virtual world created by an application. These virtual objects may include, but are not limited to, video game characters, trees, mountains, animals, fireworks, arrows, monsters, sports balls, and other environmental effects.

A common application of AR technology is for displaying real world imagery including live video or still images, and overlaying (i.e., superimposing) virtual objects on the real world imagery. To produce such AR imagery, a camera captures a video or still image of the real world, and a computing device superimposes one or more virtual objects over the captured video or still image.

AR images can be more entertaining when the virtual objects shown in the AR imagery convincingly appear to exist in the real world. However, in many cases, the depiction of interactions between virtual and real world objects in AR imagery is less than realistic. As a result, user engagement with the games or any other content may be decreased by the less than realistic depiction, thereby causing lower levels of user engagement.

AR games can be utilized to encourage physical activity. For example, augmented reality games may cause displays of characters based on location and movements of a user device. This location and movement-based character display may cause users to actively and physically move to different locations in order to interact with the characters.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include a method for providing augmented reality challenges. The method comprises: obtaining at least one multimedia content element; causing generation of at least one signature for each obtained multimedia content element; determining, based on the generated signatures, at least one augmented reality challenge; identifying, based on the determined at least one augmented reality challenge, at least one augmented reality object; creating at least one challenge multimedia content element by causing addition of the at least one augmented reality object to the obtained at least one multimedia content element; and causing a display of the created at least one challenge multimedia content element.

The embodiments disclosed herein also include a non-transitory computer-readable medium having stored thereon instructions for causing one or more processing units to execute a method, the method comprising: obtaining at least one multimedia content element; causing generation of at least one signature for each obtained multimedia content element; determining, based on the generated signatures, at least one augmented reality challenge; identifying, based on the determined at least one augmented reality challenge, at least one augmented reality object; creating at least one challenge multimedia content element by causing addition of the at least one augmented reality object to the obtained at least one multimedia content element; and causing a display of the created at least one challenge multimedia content element.

The embodiments disclosed herein also include a system for providing augmented reality challenges. The system comprises: a processing circuitry; and a memory, the memory containing instructions that, when executed by the processing circuitry, configure the system to: obtain at least one multimedia content element; cause generation of at least one signature for each obtained multimedia content element; determine, based on the generated signatures, at least one augmented reality challenge; identify, based on the determined at least one augmented reality challenge, at least one augmented reality object; create at least one challenge multimedia content element by causing addition of the at least one augmented reality object to the obtained at least one multimedia content element; and cause a display of the created at least one challenge multimedia content element.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
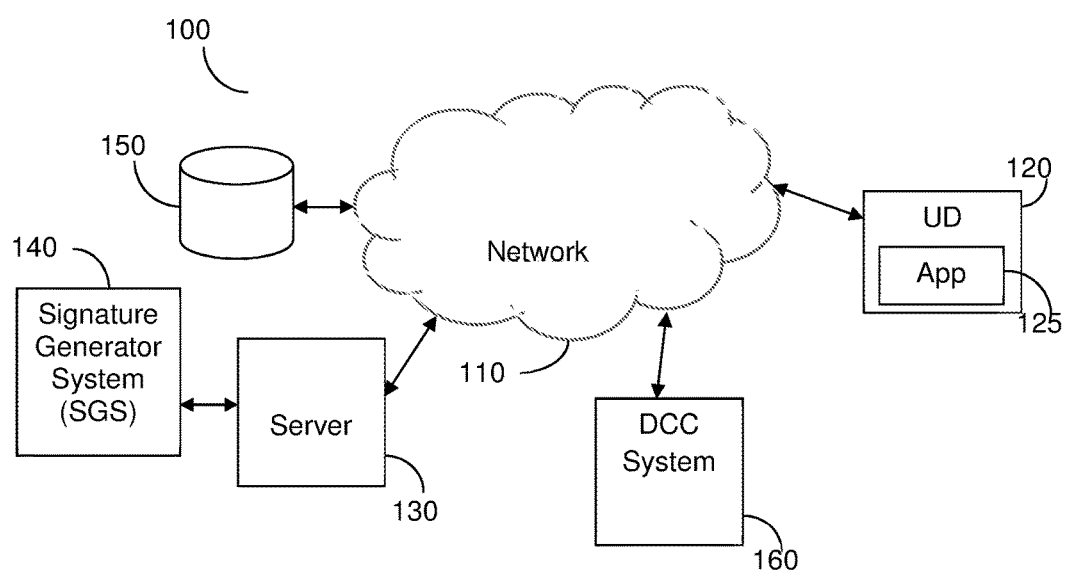
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing augmented reality challenges. At least one multimedia content element is obtained. At least one signature is generated for each multimedia content element. At least one concept is identified based on the multimedia content elements, where each concept is a collection of signatures and metadata representing the concept. Based on the concepts and signatures, metadata is generated. At least one augmented reality challenge is determined based on the metadata. At least one augmented reality object is generated for each augmented reality challenge and added to the at least one multimedia content element as an overlay. In a further embodiment, sensor data is received from a user device on which the overlaid at least one multimedia content element was displayed, and the sensor data is analyzed to determine whether the at least one augmented reality challenge was completed.

FIG. 1 shows an example network diagram 100 utilized to describe the various disclosed embodiments. A network 110 is used to communicate between different parts of the system 100. The network 110 may be the Internet, the world-wide-web (WWW), a local area network (LAN), a wide area network (WAN), a metro area network (MAN), and other networks capable of enabling communication between the elements of the system 100.

Further connected to the network 110 is a user device (UD) 120, a server 130, a signature generator system (SGS) 140, a database 150, and a deep content classification (DCC) system 160. The user device 120 may be, but is not limited to, a personal computer (PC), a personal digital assistant (PDA), a mobile phone, a smart phone, a tablet computer, an electronic wearable device (e.g., glasses, a watch, etc.), or any other kinds of wired or mobile appliance, equipped with browsing, viewing, capturing, storing, listening, filtering, and managing capabilities enabled as further discussed herein below.

The user device 120 may further have a software application (App) 125 installed thereon. The application 125 may be downloaded from an application repository such as, e.g., AppStore®, Google Play®, or any other repository hosting software applications. The application 125 may be pre-installed in the user device 120. The application 125 may be a web browser. It should be noted that the embodiments described herein with respect to FIG. 1 are discussed with respect to one user device 120 and one application 125 merely for simplicity purposes and without limitation on the disclosed embodiments. The embodiments disclosed herein are equally applicable to multiple user devices, and each user device may be installed with one or more applications.

Also communicatively connected to the network 110 is the database 150. The database 150 may store information such as, but not limited to, multimedia content elements, metadata related to multimedia content elements, metadata associated with users and user devices, rules for determining challenges, rules for selecting augmented reality objects for challenges, rules for placing augmented reality objects for challenges (e.g., overlaying an augmented reality object on a multimedia content element showing a particular geographical location, overlaying an augmented reality object over a particular real world object, etc.), combinations thereof, and the like. As shown in FIG. 1, the server 130 may communicate with the database 150 through the network 110. In other non-limiting embodiments, the server 130 is directly connected to the database 150.

In an embodiment, the server 130 is configured to communicate with the SGS 140 and the DCC system 160 to perform the various disclosed embodiments. The SGS 140 and the DCC 160 may be connected to the server 130 directly, or may communicate with the server 130 over the network 110. In some configurations, the SGS 140, the DCC system 160, or both, may be integrated within the server 130.

The server 130 typically includes a processing circuitry 132 coupled to a memory 134. The memory 134 contains instructions that can be executed by the processing circuitry 132. The instructions, when executed by the processing circuitry 132, configure the server 130 to perform the various disclosed methods. The server 130 also typically includes a network interface (not shown) utilized for communicating with the network 110.

The processing circuitry 132 may comprise or be a component of a processor (not shown) or an array of processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 120 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

In another embodiment, the processing circuitry 132 can be realized an array of computational cores having properties that are at least partly statistically independent from other cores of the plurality of computational cores. The array of computational cores configured as described further herein below.

The server 130 is configured to receive and utilize multimedia content elements. To this end, the server 130 may be configured to, but not limited to, identify metadata associated with the multimedia content element, save the received multimedia content elements and associated metadata in the database 150 or in the user device 120, generate augmented reality challenges based on metadata, generate augmented reality objects for challenges, and more. A multimedia content may be or may include, but is not limited to, an image, a graphic, a video stream, a video clip, an audio stream, an audio clip, a video frame, a photograph, and an image of signals (e.g., spectrograms, phasograms, scalograms, etc.), a combination thereof, and a portion thereof.

In an embodiment, the server 130 is configured to obtain at least one multimedia content element. The obtained at least one multimedia content element may be included in a request to provide a physical challenge based on the at least one multimedia content element. The server 130 is configured to send each identified multimedia content element to the SGS 140, the DCC system 160, or both. To which system(s) the multimedia content elements should be sent may be predetermined, or may be determined based on the results by returned by each system. For example, if the DCC 160 returns a concept based on the identified multimedia content element, there is no need to generate a signature for the element.

In another embodiment, the server 130 may be configured to, for the at least one multimedia content element, whether to provide an augmented reality challenge. In a further embodiment, the determination may be based on metadata associated with the at least one multimedia content element. As a non-limiting example, if metadata associated with the at least one multimedia content element indicates that the at least one multimedia content element was recently captured (e.g., within 2 minutes of the determination), the server 130 may determine that a challenge should be provided.

Each obtained multimedia content element is typically an image or video illustrating an area in the real world. It should be noted, however, that other types of multimedia contents, both now known and hereinafter developed, may be utilized for generating the customized augmented reality environment. Further, although the identified multimedia content elements may show the real world, the embodiments disclosed herein are not limited as such and may include superimposing characters on multimedia content representing, e.g., virtual reality or any otherwise artificial (i.e., not necessarily part of the real physical world) areas may be equally utilized without departing from the scope of the disclosure. For example, images from a virtual reality program may be analyzed and further enhanced by generating customized augmented reality environments based on the virtual reality images.

In an embodiment, the SGS 140 is configured to receive a multimedia content element and to generate at least one signature for each of the received at least one multimedia content element. The at least one signature can be generated using a plurality of computational cores, where each core of the plurality of computational cores is at least partially statistically independent of the other computational cores. In a further embodiment, each generated signature is robust to noise and distortion. The generation of signatures for multimedia content elements is described further herein below.

In an embodiment, based on the generated signatures, the server 130 is configured to determine at least one augmented reality challenge. The at least one augmented reality challenge may be stored in, e.g., the database 150. To this end, in an embodiment, the server 130 may be configured to query the database 150 using the generated signatures. In a further embodiment, each augmented reality challenge may be or may include a physical challenge, i.e., a challenge that requires the user of the user device 120 to perform some physical activity to be completed. The challenge may include, but is not limited to, providing a user gesture (e.g., swiping, sliding, tapping, or otherwise interacting with the user device), answering one or more questions, performing a physical task (e.g., running, jumping, walking, climbing, etc.), combinations thereof, and the like. In a further embodiment, the challenge may include condition requirements such as, but not limited to, moving to a particular geographical location or series of geographical locations, moving at least a particular distance, and the like.

In an embodiment, the server 130 is configured to generate at least one augmented reality object for each determined augmented reality challenge, and to add the generated at least one augmented reality object to the obtained at least one multimedia content element as an overlay. Each augmented reality object is a multimedia content element and may represent, but is not limited to, a character, a mark, an item (e.g., food, books, statues, buildings, plants, bodies of water, etc.), an animal, text, and the like.

As a non-limited example for providing an augmented reality challenge, an image of Times Square in Manhattan, N.Y., is captured by the user device 120. Metadata associated with the image indicates that it was taken 5 seconds ago. Based on the metadata, it is determined that an augmented reality challenge in Times Square should be provided. A signature is generated for the image of Times Square and the database 150 is queried, based on the generated signature. The query returns an augmented reality challenge indicating that the user must find a red flag augmented reality object near a pizzeria in Times Square. When the user device 120 captures an image including the pizzeria, the server 130 adds the red flag the image as an overlay and causes a display of the overlaid image on the user device 120.

In a further embodiment, the server 130 may be configured to generate customized augmented reality challenges for the user of the user device 120. In yet a further embodiment, the customized augmented reality challenge may be generated based on metadata (e.g., metadata stored in the database 150). To this end, in an embodiment, the server 130 is configured to identify metadata associated with the user device 120, the user of the user device 120, or both. The metadata may indicate, but is not limited to, personal variables associated with the user, environmental variables associated with the user device 120, or both. The personal variables may include, but are not limited to, previous challenges presented to the user, scores for previous challenges, an average speed of the user, age, demographic information, intelligence, physical limitations (e.g., handicaps, heart conditions, allergies, etc.), and the like. The environmental variables may include, but are not limited to, previous challenges determined based on similar multimedia content elements, a current location of the user device 120, previous locations of the user device 120, time, weather, and the like.

In yet a further embodiment, the metadata used for generating the customized augmented reality challenges may include metadata associated with the obtained at least one multimedia content element. The multimedia content element metadata may include, but is not limited to, a time of capture of a multimedia content element, a geographic location of capture of the multimedia content element, a user-added annotation, and the like.

As a non-limiting example for generating a customized augmented reality challenge, metadata associated with the user and with the user device 120 is identified. The metadata includes physical variables indicating that the user is age 12, that the user previously ran up a hill in 43 seconds, and that the user device 120 is at a geographic location of the hill. The metadata is analyzed. Based on the metadata, a challenge to run up the hill in less than 40 seconds is generated. The challenge includes text indicating the goal of the challenge, and is added to multimedia content elements showing the hill as an overlay.

In another embodiment, the signature for an obtained multimedia content element may be determined based on a concept structure. The signature for each received multimedia content element may be representative of at least one concept structure (hereinafter referred to as a "concept"). A concept is a collection of signatures representing elements of the unstructured data and metadata describing the concept. As a non-limiting example, a 'Superman concept' is a signature-reduced cluster of signatures describing elements (such as multimedia elements) related to, e.g., a Superman cartoon: a set of metadata representing proving textual representation of the Superman concept. Techniques for generating concept structures (or "concepts") are also described in the above-referenced U.S. Pat. No. 8,266,185 (hereinafter '185) to Raichelgauz, et al., which is assigned to common assignee, and is incorporated hereby by reference for all that it contains.

According to this embodiment, the server 130 is configured to send, to the DCC system 160, a query for matching the multimedia content element to at least one concept structure. If a match is found, the metadata of the matching concept may be utilized to, e.g., generate the at least one customized augmented reality challenge. The matching may include, but is not limited to, matching at least one signature generated for the multimedia content element to a plurality of concept signatures, where each concept signature represents a concept. The signatures generated for the multimedia content element may be generated by, e.g., the SGS 140, the DCC system 160, and the like. The matching may be performed for all concepts maintained by the DCC system 160.

It should be noted that if multiple concepts are determined to match a multimedia content element, the server 130 may be configured to correlate among the matching concepts to generate a tag or other metadata that best describes the multimedia content element. The correlation may further be based on, but not limited to, a ratio between signatures' respective sizes, a spatial location of each signature, one or more probabilistic models, and the like.

In a further embodiment, a user response to the challenge may be subsequently received as sensor data from the user device 120. The sensor data may include, but is not limited to, interactions with a touch screen, images, videos, audio, GPS signals, magnetometer signals, gyroscope signals, accelerometer signals, light sensor signals, combinations thereof, and other sensor signals. Based on the sensor data, the server 130 may be configured to determine whether the user completed the challenge. As a non-limiting example, if the challenge is to walk up a hill, the received sensor data may include accelerometer signals. The accelerometer signals may be analyzed to determine that the user did walk up a hill and, therefore, completed the challenge.

In yet a further embodiment, the server 130 may be configured to analyze the sensor data and to generate, based on the analysis, a score indicating a level of performance of the user. In a further embodiment, the server 130 is configured to send the score to the user device 120. In another embodiment, the score may be sent for storage in, e.g., the database 150.

It should be noted that the signatures generated for the multimedia content elements enables accurate analysis of the elements, because the signatures generated according to the disclosed embodiments allow for recognition and classification of multimedia content.

It should also be noted that the SGS 140 is shown in FIG. 1 as a separate device from the server 130 and from the user device 120 merely for simplicity purposes and without limitation on the disclosed embodiments. The SGS 140 may be included in the server 130 or the user device 120 without departing from the scope of the disclosure. Inclusion of a signature generator in a user device is described further herein below with respect to FIG. 6.

Figure 2:
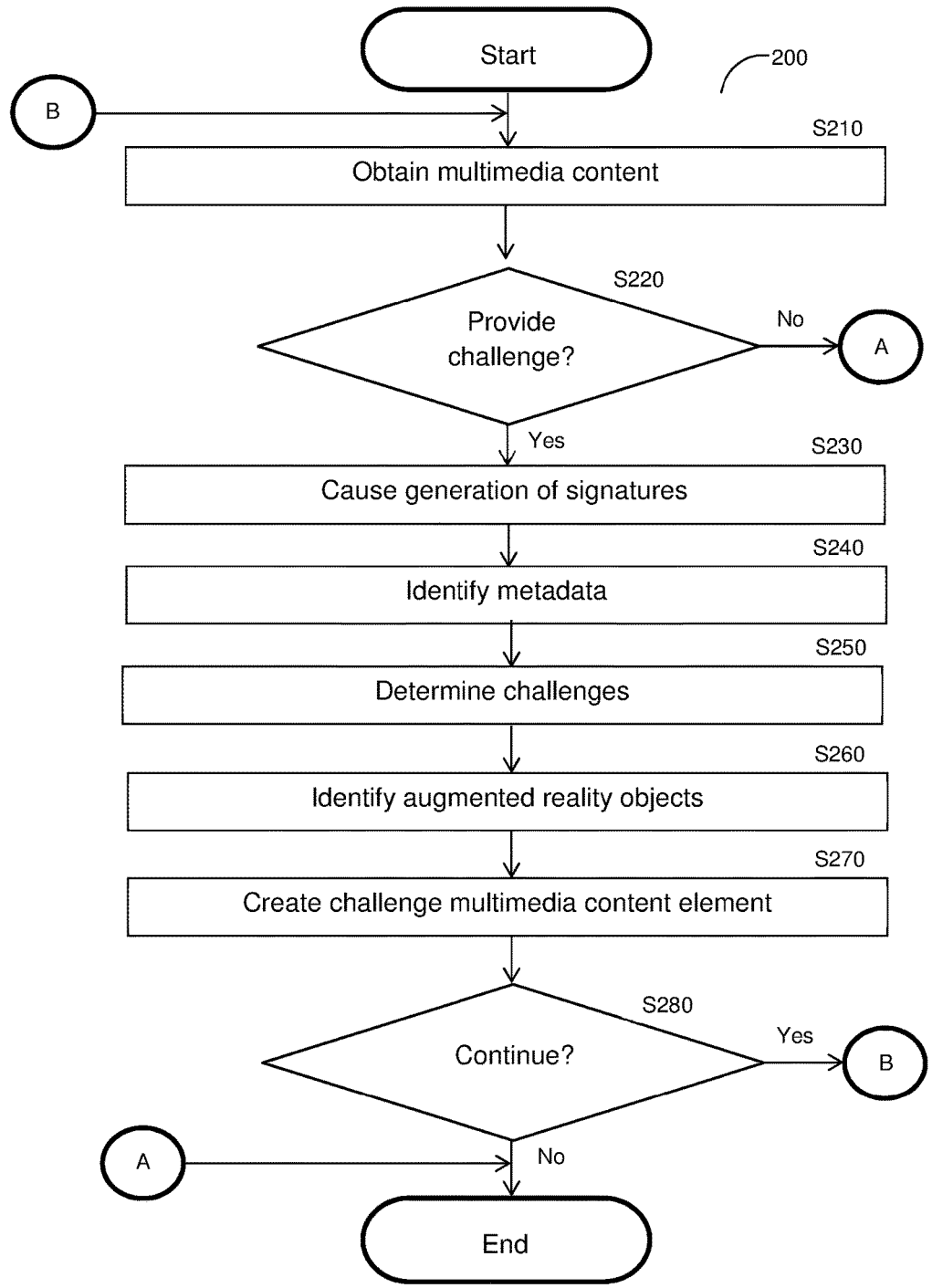
FIG. 2 is a flowchart illustrating providing challenges using augmented reality objects according to an embodiment.

FIG. 2 is an example flowchart 200 illustrating a method for providing augmented reality challenges according to an embodiment. In an embodiment, the method may be performed by a server (e.g., the server 130) based on multimedia content elements captured by a user device (e.g., the user device 120). In another embodiment, part or all of the method may be performed by an application (e.g., the application 125) installed on a user device.

At S210, at least one multimedia content element is obtained. The at least one multimedia content element may be captured by the user device, and may be, e.g., received from the user device, retrieved from a database (e.g., the database 150), and the like.

At optional S220, based on the obtained at least one multimedia content element, it may be determined whether a challenge should be provided and, if so, execution continues with S230; otherwise, execution terminates. In a further embodiment, S220 may include identifying metadata associated with the at least one multimedia content element and determining, based on the metadata, whether to provide the challenge. The determination of whether to provide the challenge may be further based on one or more predetermined challenge provision rules. As a non-limiting example, a challenge provision rule may indicate that a challenge should only be issued if the at least one multimedia content element was captured recently (e.g., within a predetermined threshold amount of time from a current time).

At S230, generation of at least one signature is caused for each obtained multimedia content element. In an embodiment, each signature may be generated by a signature generator (e.g., the SGS 140) as described further herein below with respect to FIGS. 4 and 5.

At optional S240, metadata may be identified. The metadata may be metadata stored in a database (e.g., the database 150), or in a storage of the user device. The metadata may be metadata associated with, but not limited to, the user, the user device, the obtained at least one multimedia content element, a combination thereof, and the like.

At S250, at least one augmented reality challenge is determined for the at least one multimedia content element. The at least one augmented reality challenge may be determined based on, but not limited to, the generated signatures, the identified metadata, a combination thereof, and the like. In an embodiment, S250 may further include generating at least one customized augmented reality challenge. Generating a customized augmented reality challenge is described further herein below with respect to FIG. 7.

At S260, at least one augmented reality object to be added to the at least one multimedia content element is identified. Each augmented reality object is a multimedia content element. The identified augmented reality objects may be associated with the determined challenge.

At S270, the identified at least one augmented reality object is added to the at least one multimedia content element as an overlay to create at least one challenge multimedia content element. In an embodiment, S270 further causing a display of the at least one challenge multimedia content element. In a further embodiment, S270 includes sending the overlaid at least one multimedia content element to the user device.

At S280, it is determined whether additional multimedia content elements have been obtained and, if so, execution continues with S210; otherwise, execution terminates.

Figure 3:
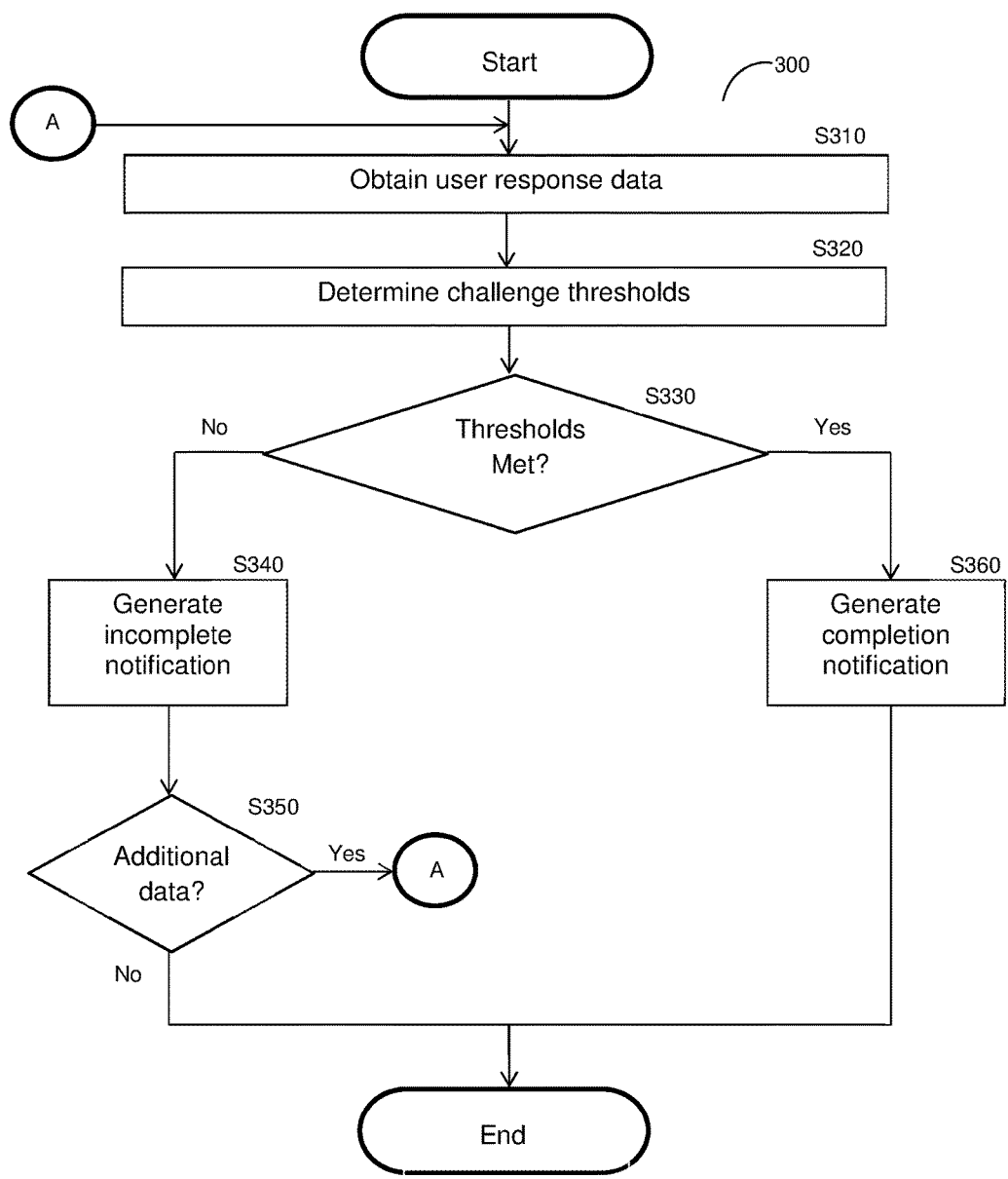
FIG. 3 is a flowchart illustrating a method for determining whether a user met an augmented reality challenge according to an embodiment.

FIG. 3 is an example flowchart 300 illustrating a method for determining whether an augmented reality challenge has been completed according to an embodiment. In an embodiment, the method may be performed by a server (e.g., the server 130), a user device (e.g., the user device 120), or partially performed on both a server and a user device. The augmented reality challenge may be an augmented reality challenge provided, for example, via at least one challenge multimedia content element as described herein above with respect to FIG. 2.

At S310, data associated with a user response to the augmented reality challenge is obtained. The user response data may include, but is not limited to, sensor data as described further herein above. The user response data represents a response by the user of the user device to the augmented reality challenge including, for example, answers to questions, user gestures made via the user device, physical actions (e.g., walking, running, climbing, relocating, etc.), combinations thereof, and the like.

At S320, at least one challenge threshold is determined. The challenge thresholds represent requirements for completing the challenges and may include, but are not limited to, a distance traveled, a set of required actions, a new geographical location, and the like. In an embodiment, S320 includes retrieving the at least one challenge threshold from a database (e.g., the database 150). Each challenge threshold may be determined based on, e.g., the augmented reality challenge. For example, the database may include a set of augmented reality challenges and corresponding challenge thresholds.

At S330, it is determined whether the at least one challenge threshold was met and, if so, execution continues with S360; otherwise, execution continues with S340.

At optional S340, a notification indicating that the challenge was not completed may be generated and sent (e.g., to the user device), and execution continues with S350. In an embodiment, the notification may be generated and sent only if the at least one challenge threshold was not met a predetermined number of times. For example, a notification indicating that the challenge was not completed may only be generated and sent after the third time user response data was received that did not meet the at least one challenge threshold.

At S350, it is checked whether additional user response data has been received and, if so, execution continues with S310; otherwise, execution terminates. Checking for additional user response data allows the user additional opportunities (e.g., the predetermined number of times) to complete the challenge before a failure to complete notification is sent.

At S360, a notification indicating that the challenge has been completed is generated and sent (e.g., to the user device). In an embodiment, S360 further includes determining a user performance score based on the user response data. In a further embodiment, the user performance score may be determined further based on user performance data of other users stored in a database (e.g., the database 150).

Figure 4:
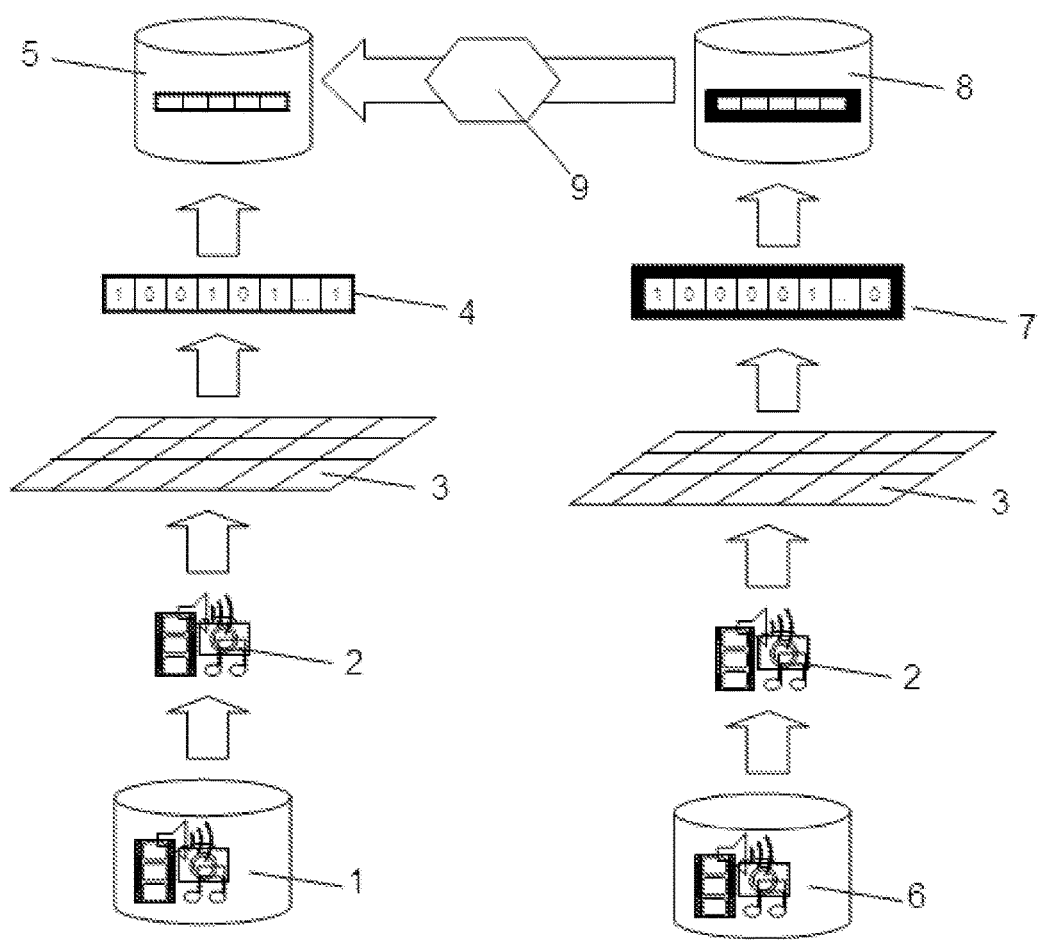
FIG. 4 is a block diagram depicting the basic flow of information in the signature generator system.
Figure 5:
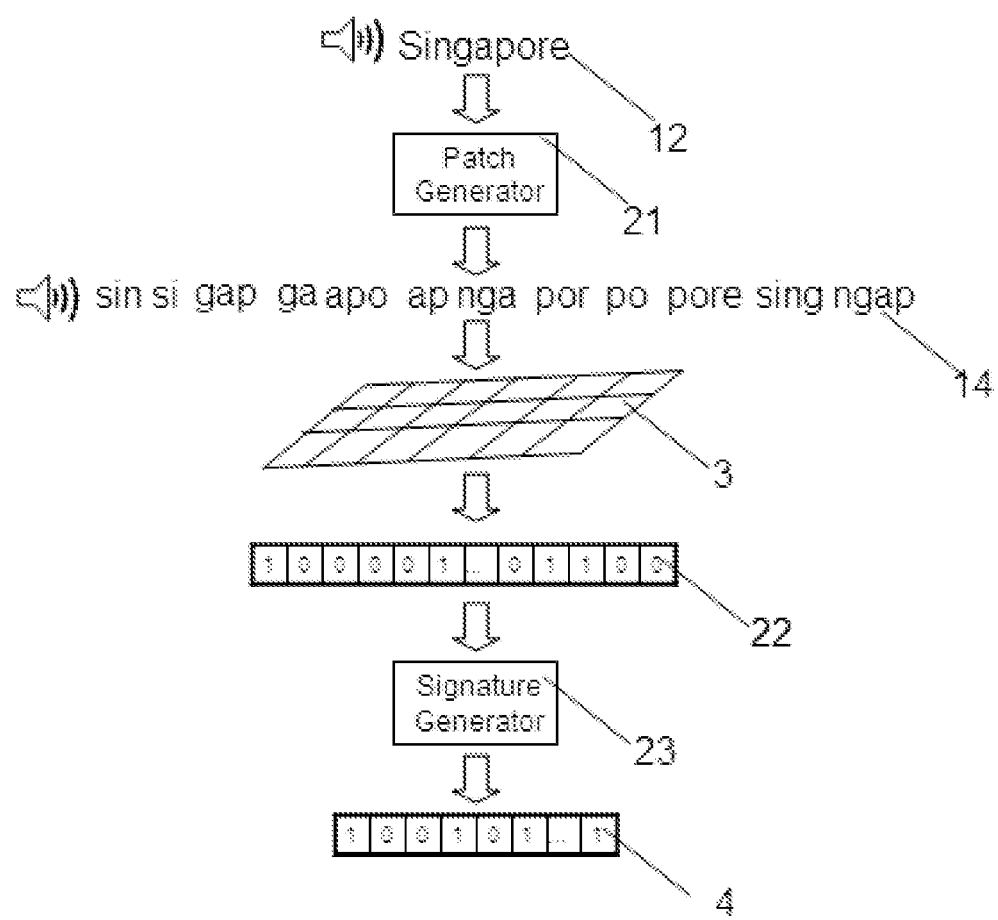
FIG. 5 is a diagram showing the flow of patches generation, response vector generation, and signature generation in a large-scale speech-to-text system.

FIGS. 4 and 5 illustrate the generation of signatures for the multimedia content elements by the SGS 140 according to one embodiment. An exemplary high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Finally, Target Robust Signatures and/or Signatures are effectively matched, by a matching algorithm 9, to Master Robust Signatures and/or Signatures database to find all matches between the two databases.

To demonstrate an example of the signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames. In an embodiment the server 130 is configured with a plurality of computational cores to perform matching between signatures.

The Signatures' generation process is now described with reference to FIG. 5. The first step in the process of signatures generation from a given speech-segment is to breakdown the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3 a frame "i" is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \leq i \leq L$) may consist of a single leaky integrate-to-threshold unit (LTU) node or more nodes. The node $n_i$ equations are:

$$V_i \sum_j w_{ij} k_j$$

$$n_i = \theta(Vi - Th_x)$$

where, $\theta$ is a Heaviside step function; $w_{ij}$ is a coupling node unit (CNU) between node i and image component j (for example, grayscale value of a certain pixel j); kj is an image component 'j' (for example, grayscale value of a certain pixel j); Thx is a constant Threshold value, where 'x' is 'S' for Signature and 'RS' for Robust Signature; and Vi is a Coupling Node Value.

The Threshold values Thx are set differently for Signature generation and for Robust Signature generation. For example, for a certain distribution of Vi values (for the set of nodes), the thresholds for Signature ($Th_S$) and Robust Signature ($Th_{RS}$) are set apart, after optimization, according to at least one or more of the following criteria.

1: For: $V_i > Th_{RS}$ $$1 - p(V > Th_S) - 1 - (1-\varepsilon)^l \ll 1$$

i.e., given that l nodes (cores) constitute a Robust Signature of a certain image I, the probability that not all of these I nodes will belong to the Signature of same, but noisy image, $\tilde{I}$ is sufficiently low (according to a system's specified accuracy).

2: $p(V_i > Th_{RS}) \approx l/L$ i.e., approximately l out of the total L nodes can be found to generate a Robust Signature according to the above definition.

3: Both Robust Signature and Signature are generated for certain frame i.

In order to generate signatures robust to additive noises, such as White-Gaussian-Noise, scratch, etc., and robust to distortions, such as crop, shift and rotation, etc., the core $C_i$ should consist of a group of nodes (LTUs): $C_i=\{n_{im}\}$, where m is the number of nodes in each core I, generated according to certain statistical processes, modeling variants of certain set of distortions.

The first step in generation of distortions-invariant signatures is to generate m Signatures and Robust Signatures, based on each of the m nodes in all the L cores, according to the previously described (above) algorithm. The next step is to determine a subset V of m potential signatures-variants for certain frame i. This is done by defining a certain consistent and robust selection criterion, for example, select top f signature-variants out of m, with highest firing-rate across all L computational cores. The reduced set will be used as Signature and Robust Signature, invariant to distortions which were defined and used in the process of computational cores generation.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found in U.S. Pat. Nos. 8,326,775 and 8,312,031, assigned to common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

A detailed description of the Computational Core generation and the process for configuring such cores is discussed in more detail in the above-mentioned U.S. Pat. No. 8,655,801.

Figure 6:
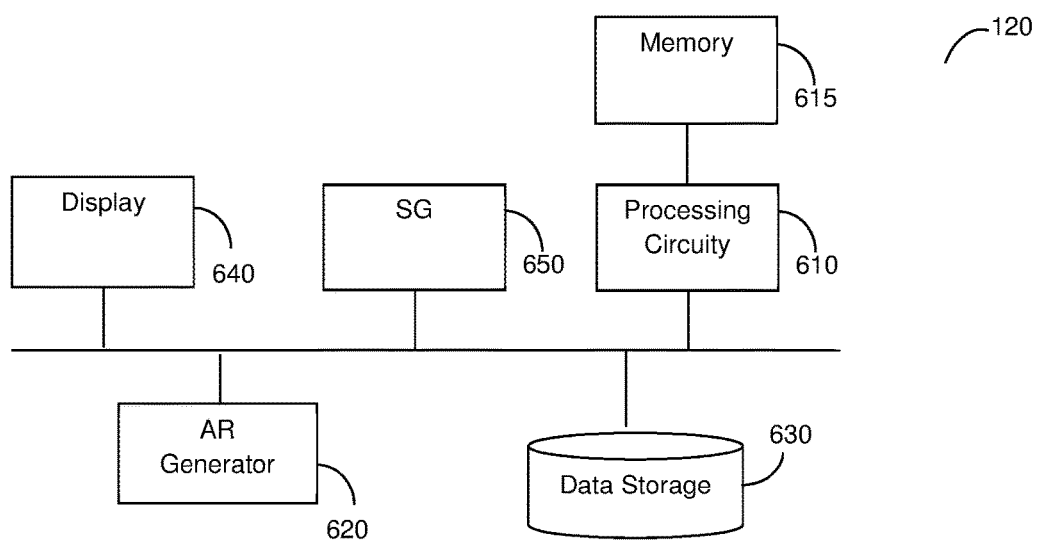
FIG. 6 is an example block diagram of a user device configured to provide augmented reality challenges according to an embodiment.

FIG. 6 is an example block diagram of a user device 120 configured to generate and display a customized augmented reality environment according to an embodiment. The user device 120 includes a processing circuity 610 coupled to a memory 615. The memory contains instructions that, when executed by the processing circuitry 610, configures the user device 120 to generate and display the augment reality environment and challenges of other applications (e.g., the app 125, FIG. 1) installed in the user device 120. The user device 120 may further include an augmented reality (AR) generator 620, a local storage 630, a display 640, and a signature generator (SG) 650.

The signature generator 650 may be configured to generate signatures for multimedia content elements. In a further embodiment, the signature generator 610 includes a plurality of computational cores as discussed further herein above, where each computational core is at least partially statistically independent of the other computational cores.

The data storage 630 may store a plurality of multimedia content elements, a plurality of concepts, signatures for the multimedia content elements, signatures for the concepts, or a combination thereof. In a further embodiment, the data storage 630 may include a limited set of concepts relative to a larger set of known concepts. Such a limited set of concepts may be utilized when, for example, the data storage 630 is included in a device having a relatively low storage capacity such as, e.g., a smartphone or other mobile device, or otherwise when lower memory use is desirable.

The AR generator 620 is configured to receive or otherwise retrieve a multimedia content element from the local storage. The AR generator 620 is further configured to initialize the signatures generator (SG) 650 to generate at least one signature for the received the multimedia content element. The AR generator 620 is configured to match the generated signatures against the concepts stored in the storage 630. Matching concepts are utilized to generate the customized augmented reality environment as discussed in greater detail above with respect to FIG. 1. Once generated, the customized augmented reality environment is displayed over the display 640.

The AR generator 620 and the processing circuitry 610 can be implemented as a component of a processor (not shown) or an array of processors, examples of which are provided above.

Figure 7:
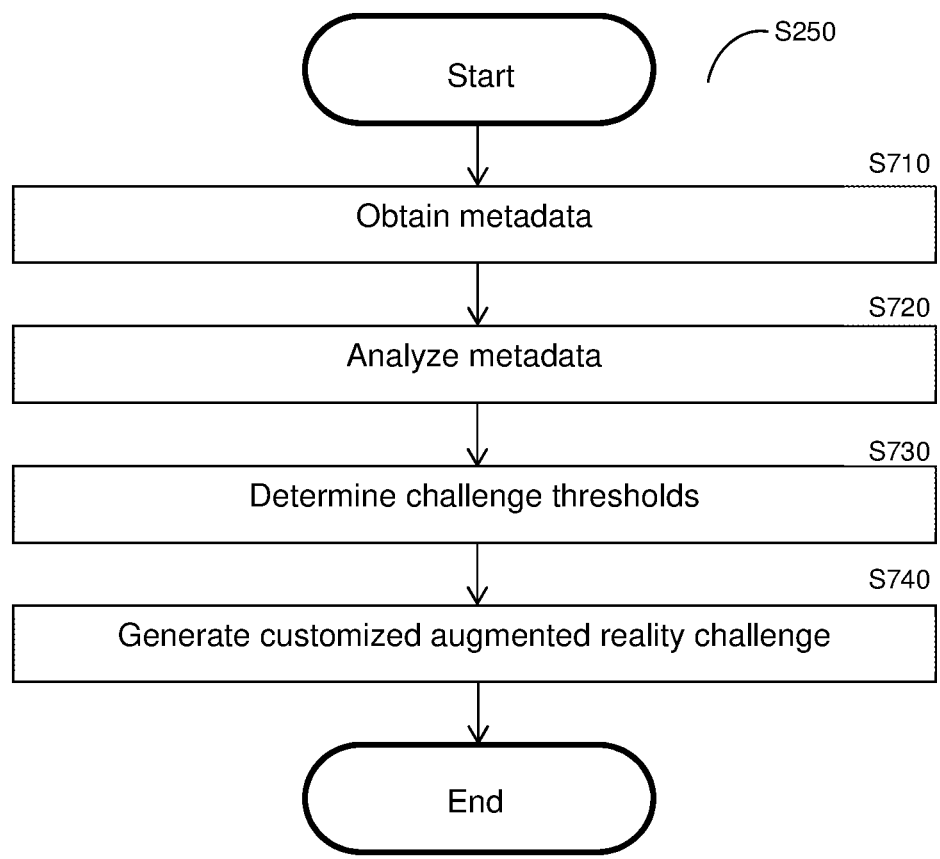
FIG. 7 is a flowchart illustrating generating a customized augmented reality challenge according to an embodiment.

FIG. 7 is an example flowchart S250 illustrating a method for generating a customized augmented reality challenge according to an embodiment. In an embodiment, the method may utilize identified metadata stored in, e.g., a storage of a user device, a database, or both.

At optional S710, metadata related to a user of a user device, to the user device, or to both, is obtained. The metadata may be stored in a storage of the user device or in an external storage (e.g., a database). The metadata may include, but is not limited to, personal variables associated with the user, environmental variables associated with the user device, or both. The metadata may further include metadata associated with one or more multimedia content elements.

At S720, metadata related to a user of a user device, to the user device, to a multimedia content element, or a combination thereof, is analyzed. The analysis may include, but is not limited to, determining an age of the user, determining a current location of the user device, determining past challenge performance of the user, a combination thereof, and the like.

At S730, based on the analysis, at least one augmented reality challenge threshold is determined. Each augmented reality challenge threshold represents a requirement for completing the customized augmented reality challenge, and may be based on, e.g., user response data. For example, an augmented challenge reality threshold may be a distance of 300 feet as determined based on GPS data received as a response to the augmented reality challenge.

Each augmented reality challenge threshold may be determined based on at least one threshold selection criterion. Further, the threshold selection criteria used to determine the augmented reality challenge thresholds may differ among users and user devices. The threshold selection criterion may be, e.g., stored in a database, and may be based on, but not limited to, the age of the user, the current location of the user device, past challenge performance of the user, any relevant health conditions, a combination thereof, and the like. For example, the threshold selection criteria may indicate that a challenge threshold for a running challenge should be to run 100 feet in 20 seconds for an 8 year old user, and to run 100 feet in 15 seconds for a 12 year old user.

At S740, the customized augmented reality challenge is generated based on the determined challenge thresholds. In a further embodiment, S740 may also include generating a notification indicating the challenge thresholds and sending, to a user device, the generated notification for display. In yet a further embodiment, S740 may include causing addition of the generated notification as an overlay of a multimedia content element.

As used herein, the phrase "at least one of" followed by a listing of items means that any of the listed items can be utilized individually, or any combination of two or more of the listed items can be utilized. For example, if a step in a method is described as including "at least one of A, B, and C," the step can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for automatically providing augmented reality challenges, comprising:
   capturing by a camera at least one multimedia content element;
   generating at least one signature for each obtained multimedia content element;
   determining, based on the at least one signature generated for each obtained multimedia content element, at least one augmented reality challenge;
   identifying, based on the determined at least one augmented reality challenge, at least one augmented reality object;
   creating at least one challenge multimedia content element by causing addition of the at least one augmented reality object to the obtained at least one multimedia content element;
   causing a display, on a display of the user device, of the created at least one challenge multimedia content element;
   sensing, by at least one sensor of the user device, a user response to the at least one augmented reality challenge; and
   determining, based on at least the user response, whether the user completed the at least one challenge.

2. The method of claim 1, further comprising: identifying metadata associated with at least one of: a user of a user device, the user device and the obtained at least one multimedia content element, wherein the at least one augmented reality challenge is determined further based on the identified metadata.

3. The method of claim 2, further comprising: determining, based on the identified metadata, whether the augmented reality challenge should be provided.

4. The method of claim 1, further comprising: determining, based on the determined at least one augmented reality challenge, at least one challenge threshold; wherein the determining whether the user completed the at least one challenge is responsive to the at least one challenge threshold; and generating a notification indicating that the at least one augmented reality challenge was completed, when it is determined that the user completed the at least one challenge.

5. The method of claim 4, further comprising: determining, based on the sensed user response, a user performance score.

6. The method of claim 1, further comprising: generating at least one customized augmented reality challenge, wherein the determined at least one augmented reality challenge includes the at least one customized augmented reality challenge.

7. The method of claim 6, wherein generating the at least one customized augmented reality challenge further comprises: analyzing metadata associated with at least one of: a user of a user device, the user device, and the obtained at least one multimedia content element; and determining, based on the analysis, at least one augmented reality challenge threshold, wherein the at least one customized augmented reality challenge is generated based on the at least one augmented reality challenge threshold.

8. The method of claim 6, wherein the at least one augmented reality challenge is determined further based on at least one threshold selection criterion.

9. The method according to claim 1 wherein the at least one augmented reality challenge requires a user of the user device to perform a physical activity to be completed; wherein the physical activity to be completed is a physical task selected out of running, jumping, walking and climbing.

10. The method according to claim 1 wherein the determining of the at least one augmented reality challenge comprises:
   storing in the memory only a limited set of concepts relative to a larger set of known concepts;
   matching the at least one signature generated signatures that were generated for each obtained multimedia content element to the limited set of concepts to find at least one matching concept; and
   utilizing metadata of the at least one matching concept to determine the at least one augmented reality challange.

11. The method according to claim 1 wherein the generating of the at least one signature for each obtained multimedia content element is executed by a plurality of computational cores of a signature generator; wherein each computational core of the plurality of computational cores having properties that are at least partly statistically independent of other of the plurality of computational cores.

12. A non-transitory computer readable medium having stored thereon instructions for causing one or more processing units to execute a method, the method comprising:
   capturing by a camera at least one multimedia content element;
   generating at least one signature for each obtained multimedia content element;
   determining, based on the at least one signature generated for each obtained multimedia content element, at least one augmented reality challenge;
   identifying, based on the determined at least one augmented reality challenge, at least one augmented reality object;
   creating at least one challenge multimedia content element by causing addition of the at least one augmented reality object to the obtained at least one multimedia content element;
   causing a display, on a display of the user device, of the created at least one challenge multimedia content element;
   sensing, by at least one sensor of the user device, a user response to the at least one augmented reality challenge; and
   determining, based on at least the user response, whether the user completed the at least one challenge.

13. A system for automatically providing augmented reality challenges, comprising: a camera, at least one sensor, a display, a processing circuitry, and a memory,
   the memory containing instructions that, when executed by the processing circuitry, configure the system to:
   capture, by the camera, at least one multimedia content element;
   generate, at least one signature for each obtained multimedia content element;
   determine, based on the at least one signature generated for each obtained multimedia content element, at least one augmented reality challenge;
   identify, based on the determined at least one augmented reality challenge, at least one augmented reality object;
   create at least one challenge multimedia content element by causing addition of the at least one augmented reality object to the obtained at least one multimedia content element;
   cause a display, on the display, of the created at least one challenge multimedia content element;
   sense, by the at least one sensor, a user response to the at least one augmented reality challenge; and determine, based on at least the user response, whether the user completed the at least one challenge.

14. The system of claim 13, wherein the system is further configured to: identify metadata associated with at least one of: a user of a user device, the user device and the obtained at least one multimedia content element, wherein the at least one augmented reality challenge is determined further based on the identified metadata.

15. The system of claim 14, wherein the system is further configured to: determine, based on the identified metadata, whether the augmented reality challenge should be provided.

16. The system of claim 13, wherein the system is further configured to:
  determine, based on the determined at least one augmented reality challenge, at least one challenge threshold; wherein a determining of whether the user completed the at least one challenge is responsive to the at least one challenge threshold; and
  generate a notification indicating that the at least one augmented reality challenge was completed, when it is determined that the user completed the at least one challenge.

17. The system of claim 16, wherein the system is further configured to: determine, based on the sensed user response, a user performance score.

18. The system of claim 13, wherein the system is further configured to: generate at least one customized augmented reality challenge, wherein the determined at least one augmented reality challenge includes the at least one customized augmented reality challenge.

19. The system of claim 18, wherein the system is further configured to: analyze metadata associated with at least one of: a user of a user device, the user device, and the obtained at least one multimedia content element; and determine, based on the analysis, at least one augmented reality challenge threshold, wherein the at least one customized augmented reality challenge is generated based on the at least one augmented reality challenge threshold.

20. The system of claim 18, wherein the at least one augmented reality challenge is determined further based on at least one threshold selection criterion.

* * * * *